United States Patent
Paulsen et al.

(10) Patent No.: US 10,211,510 B1
(45) Date of Patent: Feb. 19, 2019

(54) ADJACENT SIGNAL INTERFERENCE MITIGATION

(71) Applicant: Rockwell Collins, Inc., Cedar Rapids, IA (US)

(72) Inventors: Lee M. Paulsen, Cedar Rapids, IA (US); Thomas B. Campbell, Cedar Rapids, IA (US); Dana J. Jensen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 157 days.

(21) Appl. No.: 15/264,223

(22) Filed: Sep. 13, 2016

(51) Int. Cl.
| | |
|---|---|
| *H01Q 1/22* | (2006.01) |
| *H01Q 3/26* | (2006.01) |
| *H01Q 3/22* | (2006.01) |
| *H01Q 3/34* | (2006.01) |
| *H01Q 1/52* | (2006.01) |
| *H01P 5/12* | (2006.01) |
| *H04B 1/04* | (2006.01) |
| *H01Q 21/00* | (2006.01) |

(52) U.S. Cl.
CPC ............ *H01Q 1/2266* (2013.01); *H01Q 3/22* (2013.01); *H01Q 3/2611* (2013.01); *H01Q 3/2664* (2013.01); *H01Q 3/34* (2013.01); H01P 5/12 (2013.01); H01Q 1/523 (2013.01); H01Q 21/00 (2013.01); H04B 1/04 (2013.01)

(58) Field of Classification Search
CPC ........ H01Q 1/243; H01Q 3/00; H01Q 3/2664; H01Q 3/22; H01Q 3/34; H01Q 21/00; H01P 5/12; H04B 1/04
USPC ......... 343/702, 174, 754, 853; 342/368, 372
See application file for complete search history.

(56) References Cited

U.S. PATENT DOCUMENTS

| | | | |
|---|---|---|---|
| 2007/0132634 A1* | 6/2007 | Wakeman | G01S 7/4026 342/174 |
| 2013/0088381 A1* | 4/2013 | Puzella | G01S 7/032 342/154 |
| 2013/0271317 A1* | 10/2013 | Goel | G01S 19/23 342/357.62 |

* cited by examiner

*Primary Examiner* — Jessica Han
*Assistant Examiner* — Hai V Tran
(74) *Attorney, Agent, or Firm* — Angel N. Gerdzhikov; Donna P. Suchy; Daniel M. Barbieri (57) ABSTRACT

A satellite system includes directional antenna with a gain pattern response having nulls where interfering adjacent satellite signals would be received. Using an electronically scanned array (ESA), sub-arrays of the ESA sample interfering adjacent satellite signals and then filter the sampled signals from the primary single received by the ESA. Digital signal processing increases the accuracy of the filtering process by analyzing the interfering adjacent satellite signal to determine the angle-of-arrival of the signal.

17 Claims, 11 Drawing Sheets

ADJACENT SIGNAL INTERFERENCE MITIGATION

BACKGROUND

Geo-synchronous satellite systems and point-to-point communication systems must operate in the presence of interfering signals operating at the exact same frequencies. The presence of these interfering satellite signals reduces signal quality and commensurately degrades the spectral efficiency that operators of very small aperture terminals (VSAT) can realize over geo-synchronous satellite networks. A terminal designed to operate at a spectral efficiency of 1.5 bits per second per Hz may be reduced to less than 0.5 bits per second per Hz when operating under adjacent satellite interference. Such interference triples the operational costs, making data services unprofitable, particularly in mobile applications.

State of the art solutions utilize two separate apertures that move together and permit a different aspect ratio when near the equator as compared to northern latitudes. Such systems suffer from reduced performance when the narrow dimension of the antenna is aligned with the arc of the geosynchronous satellite. The beam pattern of such antenna changes slightly, but is largely fixed and cannot be adjusted dynamically to cancel adjacent satellite interference signals. Antennas in mobile applications such as aviation, trucking, and shipping are limited in size, which further limits options for overcoming adjacent satellite interference.

Some existing systems include an oversized antenna that provides good spectral efficiency, but with a huge installation footprint and weight. Such antenna is a mechanically phased array but has a fixed beam pattern that cannot be adjusted to improve adjacent satellite interference.

SUMMARY

In one aspect, embodiments of the inventive concepts disclosed herein are directed to a satellite system having an electronically scanned array (ESA) antenna. The gain pattern response of the ESA is configured with nulls where interfering adjacent satellite signals would be received.

In a further aspect, sub-arrays of the ESA are configured to sample interfering adjacent satellite signals. The sampled signal is then removed from the primary single received by the ESA.

In a further aspect, a digital signal processor analyzes the interfering adjacent satellite signal to more accurately perform interference removal.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a communication system, configured to produce a gain pattern response with nulls where interfering adjacent signals would be received. Sub-arrays of an antenna such as an ESA may be configured to sample interfering adjacent signal and then removing the sampled signal from the primary single received by the ESA. Digital signal processing may enhance the removal process.

Figure 1:
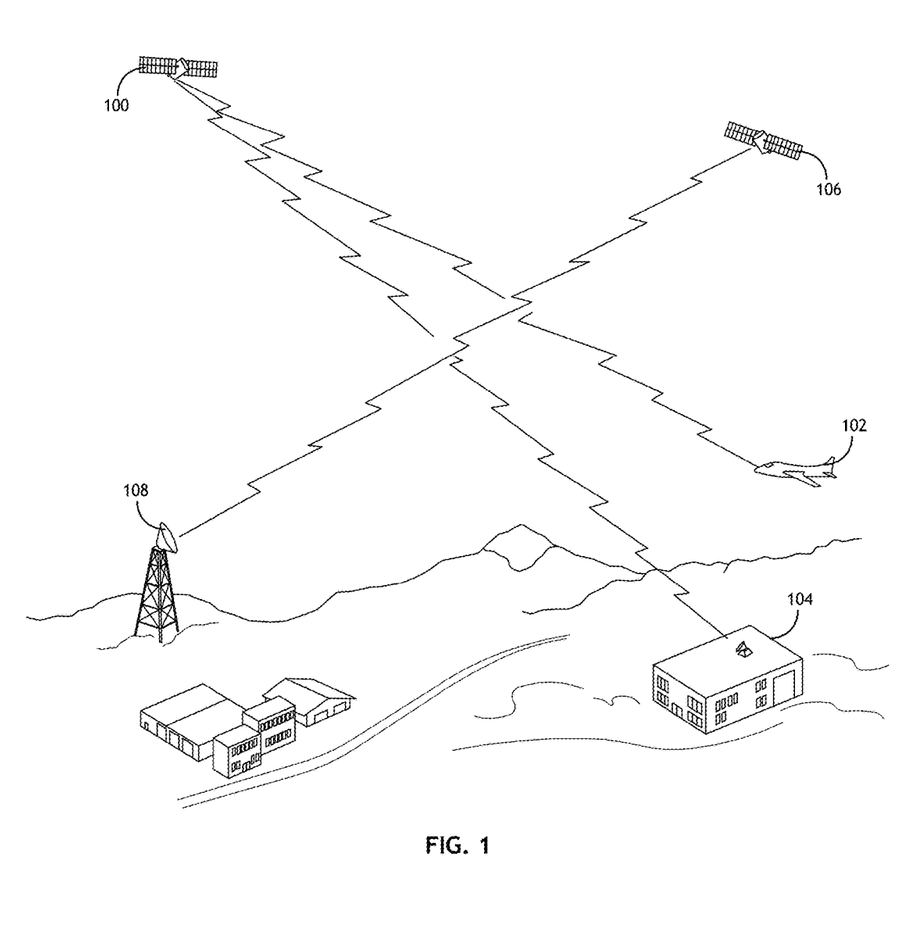
FIG. 1 shows an environmental view of a satellite system implementing embodiments of the inventive concepts disclosed herein.

Referring to FIG. 1, an environmental view of a satellite system implementing embodiments of the inventive concepts disclosed herein is shown. A primary satellite 100 according to some embodiments includes one or more antennas configured for directional communications with a mobile station 102 or fixed station 104. An adjacent satellite 106 communicating with another transmitter 108 transmits and receives signals in a frequency range similar or identical to the operating range of the primary satellite 100.

Geo-synchronous satellite systems such as the primary satellite 100 may operate in the presence of interfering adjacent satellites 106 that are spaced at +/−2°, 4°. Interfering signals reduces carrier-to-noise-plus-interference ratio and degrades spectral efficiency.

Figure 2:
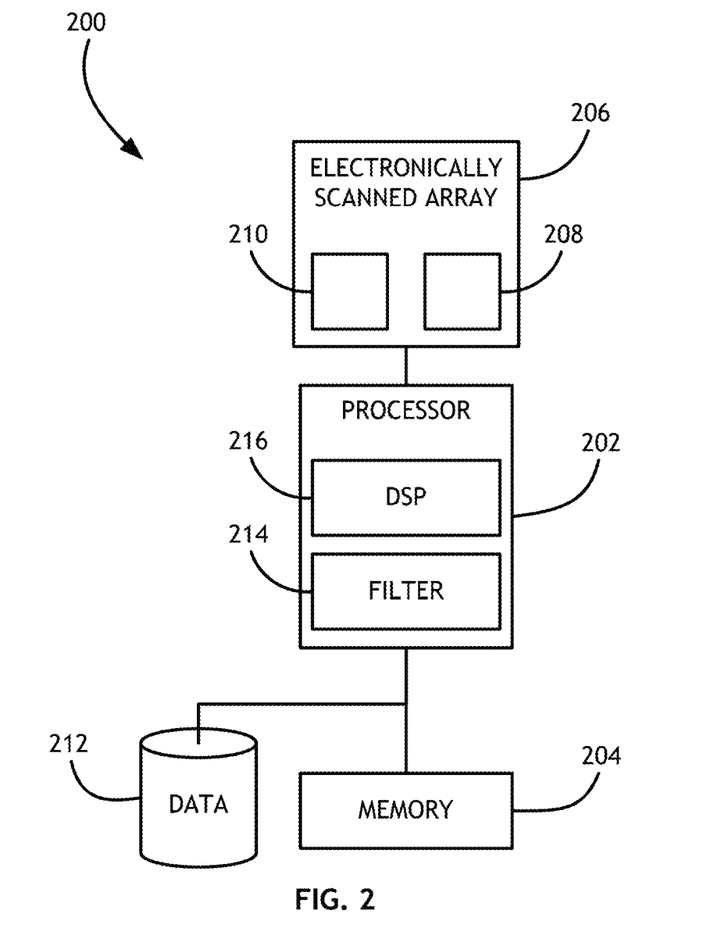
FIG. 2 shows a block diagram of a communication system for implementing exemplary embodiments of the inventive concepts disclosed herein.

Referring to FIG. 2, a block diagram of a communication system 200 for implementing exemplary embodiments of the inventive concepts disclosed herein is shown. The communication system 200 comprises a processor 202 connected to a memory 204 for storing processor executable code, and connected to one or more antenna 206. In at least one embodiment, where the one or more antennas 206 comprise an electronically scanned array (ESA), the processor 202 applies signals to sets of radiating elements 208, 210 of the ESA 206 to configure the ESA 206 to receive signals along a desired vector and operating in a desired frequency range. In some embodiments, the processor 202 configures a first set of radiating elements 208 to receive interfering signals from an adjacent source such as an adjacent satellite. The processor 202 analyzes the interfering signal to identify certain features useful for removing the interfering signal. Removing the interfering signal may utilize frequency filtering, spatial filtering, and interference or sidelobe cancellation. In some embodiments, the processor configures a second set of radiating elements 210 to receive signals according to a profile that narrowly excludes the interfering signal. In some embodiments, the processor 202 configures a filter to exclude the interfering signal based on the identified features.

In some embodiments, where the one or more antennas 206 comprise an ESA divided into a plurality of sub-arrays, or where the one or more antennas 206 a plurality of directional antennas, source separation techniques may be utilized. In such embodiments, a covariance matrix may be used to weight the plurality of signals from the antennas 206 or sub-arrays.

In some embodiments, certain known features of an adjacent satellite are stored in a data storage element 212 connected to the processor 202. The processor 202 references such features to determine a gain pattern response configured to narrowly exclude interfering signals from the adjacent satellite.

In some embodiments, the processor 202 includes, or is in data communication with, a configurable filter 214. The configurable filter 214 receives an interfering signal from the first set of radiating elements 208 and a signal from a second set of radiating elements 210 that includes both a desired signal and the interfering signal. The configurable filter 214 is configured by the signal from the first set of radiating elements 208 to filter out that signal from the signal received by the second set of radiating elements 210.

In some embodiments, a digital signal processor 216 receives an interfering signal and analyzes the interfering signal to determine an angle-of-arrival. The processor 202 uses the determined angle-of-arrival to configure the first set of radiating element 208 to more precisely sample the interfering signal.

While specific embodiments describe ESAs, other antenna aperture types are envisioned. For example, some embodiments may include a plurality of dishes with a main dish configured to receive a main signal and a side dish configured to focus on the interfering signal.

Figure 3:
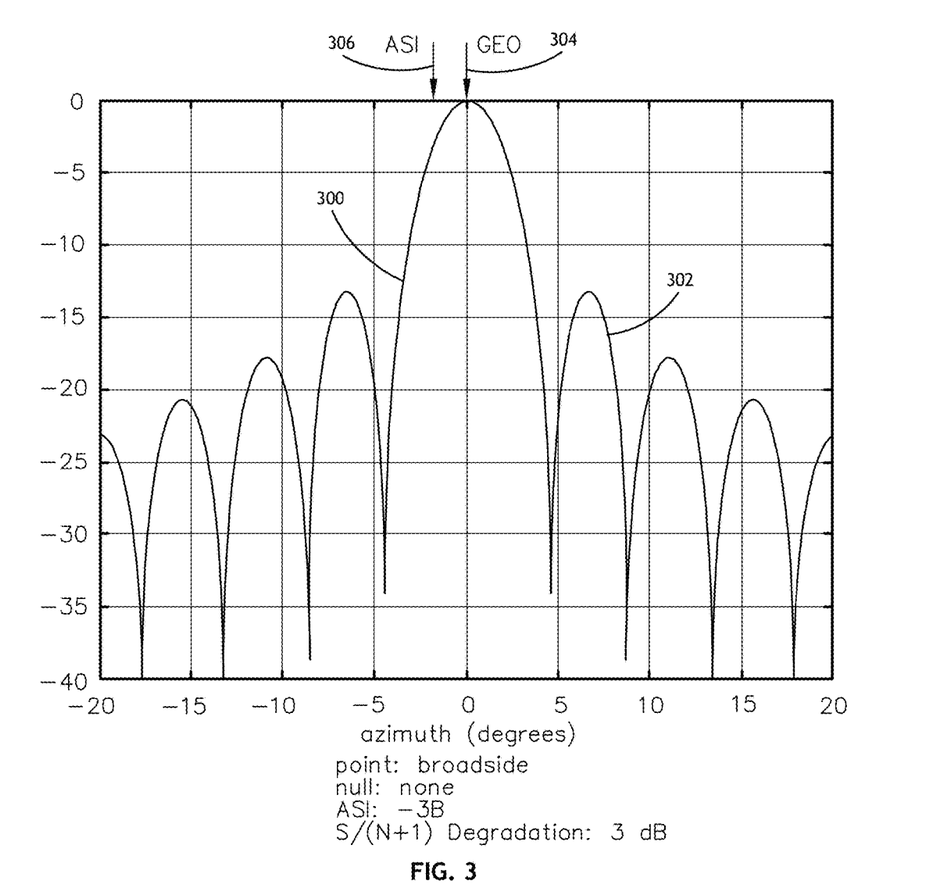
FIG. 3 shows a graph of a gain pattern response for a communication system.

Referring to FIG. 3, a graph of a gain pattern response for a communication system is shown. A communication system such as a satellite with a directional antenna applies signals to the directional antenna to produce a desired gain pattern response having a main lobe 300 corresponding to a primary vector and frequency band, and ancillary side lobes 302. The desired gain pattern response is centered with the main lobe 300 about an operating frequency 304 of the satellite.

An adjacent satellite or other interfering source may produce an interfering signal 306 in a similar or identical frequency band. The interfering signal 306 is generated from, or received by, a communication system operating in a frequency range and along a vector within the main lobe 300 of the desired gain pattern response. Interfering signals 306 within the main lobe 300 are exceptionally disruptive to communication.

Figure 4:
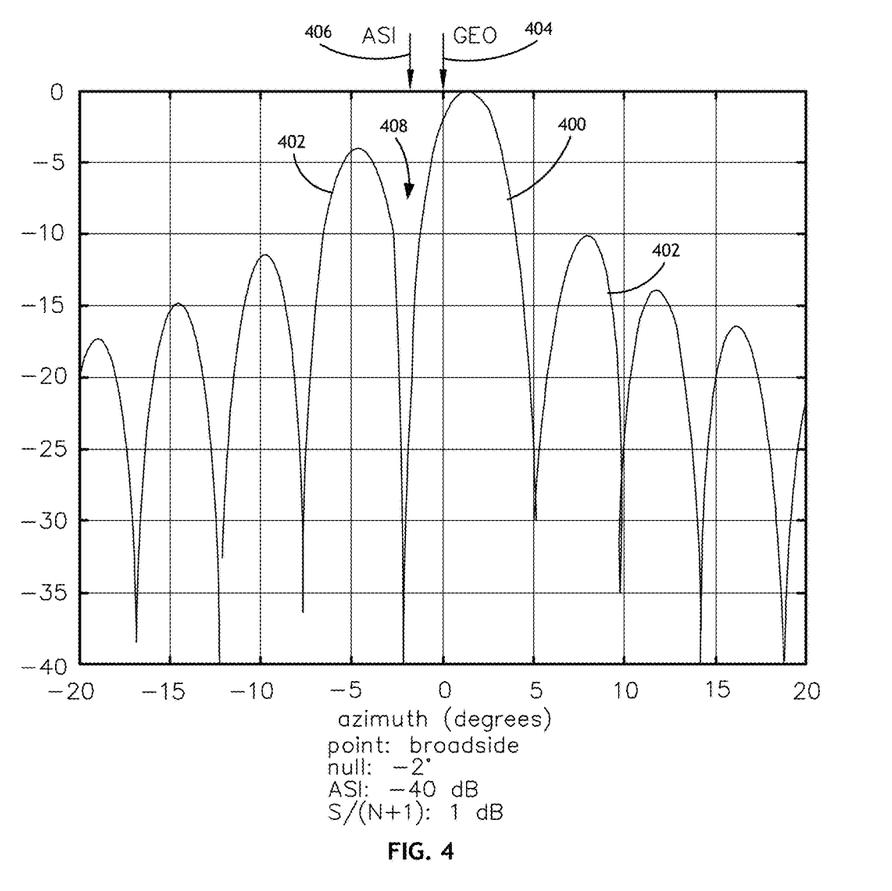
FIG. 4 shows a graph of a gain pattern response for a communication system according to embodiments of the inventive concepts disclosed herein.

Referring to FIG. 4, a graph of a gain pattern response for a communication system according to embodiments of the inventive concepts disclosed herein is shown. A communication system such as a satellite with a directional antenna applies signals to the directional antenna to produce a gain pattern response having a main lobe 400 corresponding to a primary vector and frequency band, and ancillary side lobes 402 corresponding to an operating frequency 404 of the satellite operating alongside an interfering signal 406 from an adjacent source.

A processor generating the gain pattern response analyzes the interfering signal 406 and generates signals to apply to the directional antenna to produce a gain pattern response wherein the main lobe 400 that is as close as possible to a desired signal centered about an operating frequency 404 of the satellite with the interfering signal 406 centered about a null location 408 in the gain pattern response such that the interfering signal 406 is excluded from reception by the directional antenna. For example, placing the null location 408 at −3° may reduce the impact from an adjacent interfering signal 406 with less main lobe 400 gain reduction, improving the overall carrier-to-noise-plus-interference ratio.

Figure 5:
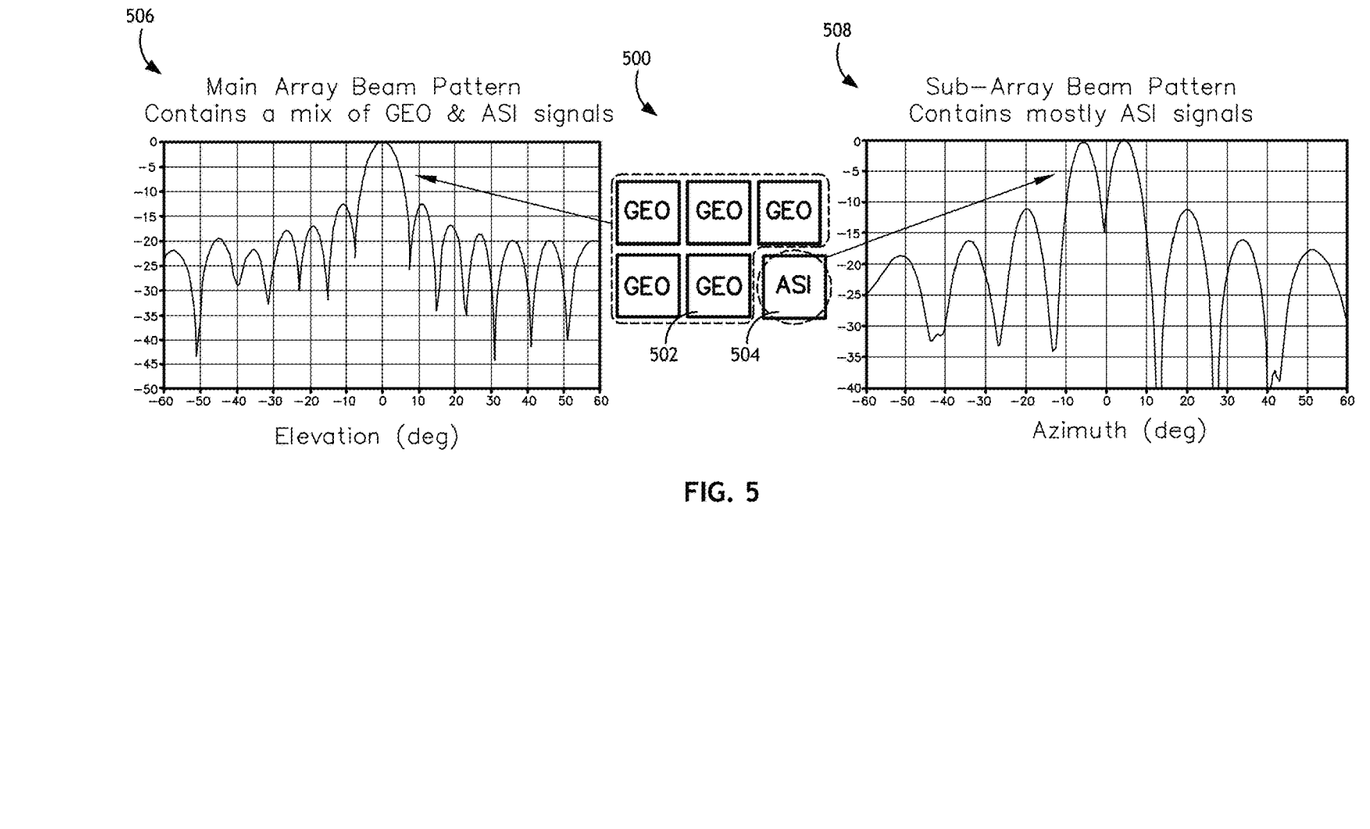
FIG. 5 shows a block diagram of a set of radiating elements in an ESA and graphs of gain pattern responses produced by the set of radiating elements according to the inventive concepts disclosed herein.

Referring to FIG. 5, a block diagram of a set of radiating elements in an ESA and graphs of gain pattern responses produced by the set of radiating elements according to the inventive concepts disclosed herein is shown. An ESA 500 comprises radiating elements 502, 504; a main array of operational radiating elements 502 define a gain pattern response 506, based on signals applied by a processor, that configure the operational radiating elements 502 to receive and potentially transmit signals in a desired frequency range, and with a desired vector, which also includes interfering signals from an adjacent source. The processor also configures a sub-array of interference sensing elements 504 to narrowly define an interfering gain pattern response 508 that points a beam to receive, primarily, the interfering signals from the adjacent source. A hardware or software defined filter then removes the interfering single from signals received via the main array of operational radiating elements 502. Filtering may comprise analog beamforming to cancel the interfering signals, digital beamforming, or some hybrid analog/digital beamforming such as analog beamforming with each of a plurality of subarrays and digital beamforming of the subarray signals. This may include forming a difference beam with minimal content from the primary source.

Referring to FIGS. 6A-6E, block diagrams of ESAs 600, 608, 612, 614, 616 according to embodiments of the inventive concepts disclosed herein are shown. The ESA 600 includes operational radiating elements 602, or sub-arrays or operational radiating elements 602, and interference sensing elements 604, or sub-arrays of interference sensing elements 604. A processor applies signals to the radiating elements 602, 604 or sub-arrays of radiating elements 602, 604 to configure the operational radiating elements 602 to receive signals along a desired vector and within a certain frequency range, and configure the interference sensing elements 604 to receive signals from one or more adjacent interfering signals along the same (or substantially similar) vector and within the same (or substantially similar) frequency range.

Figure 6A:
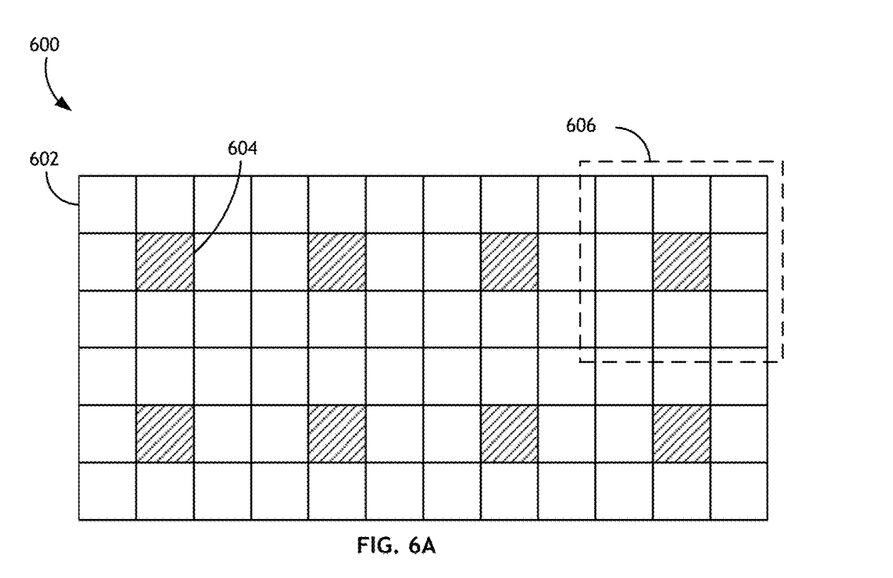
FIG. 6A shows a block diagram of a set of radiating elements in an ESA according to embodiments of the inventive concepts disclosed herein.

In some embodiments, an ESA 600 comprises blocks 606 of radiating elements 602, 604, each block 606 comprising an interference sensing element 604, or sub-array of interference sensing elements 604, and a plurality of operational radiating elements 602, or sub-arrays of operational radiating elements 602. The blocks 306 may be replicated about the entire surface of the ESA 600 or some subset of the ESA 600 surface.

Figure 6B:
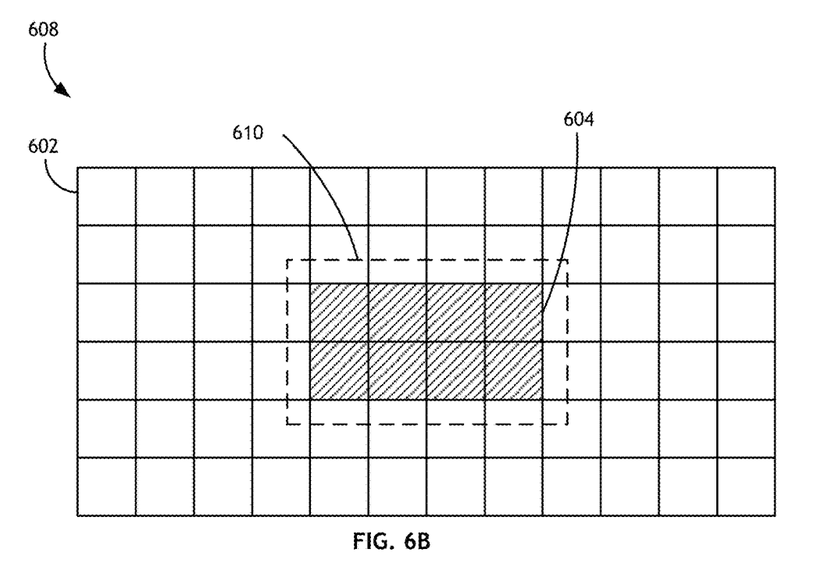
FIG. 6B shows a block diagram of a set of radiating elements in an ESA according to embodiments of the inventive concepts disclosed herein.

In some embodiments, an ESA 608 comprises operational radiating elements 602 and interference sensing elements 604. The interference sensing elements 604 are organized into a cohesive interference sensing block 610. While FIG. 6A depicts the interference sensing block 310 in the center of the ESA 608, a person skilled in the art may appreciate that such interference sensing block 610 may be located at any location, and that it may be advantageous to maintain the operational radiating elements 602 in the largest possible cohesive block. Further, the interference sensing elements 604 may be organized into a plurality of interference sensing blocks 310 disposed on the surface of the ESA 608.

Figure 6C:
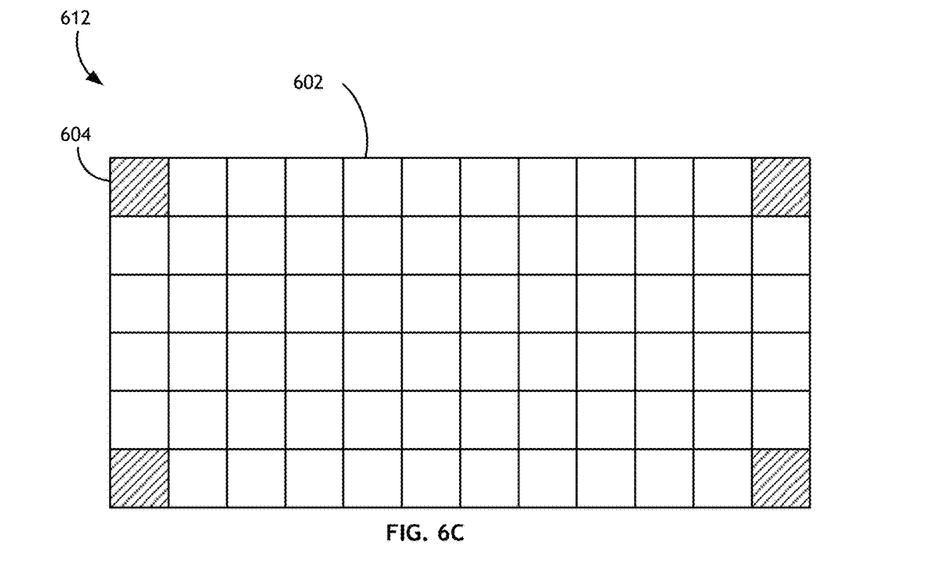
FIG. 6C shows a block diagram of a set of radiating elements in an ESA according to embodiments of the inventive concepts disclosed herein.

In some embodiments, an ESA 612 comprises operational radiating elements 602 and interference sensing elements 604. The interference sensing elements 604 are disposed at peripheral locations of the ESA 612. Locating the interference sensing elements 604 on the periphery allows the operational radiating elements 602 to maintain the largest possible cohesive block of operational radiating elements 602. While FIG. 6C depicts the interference sensing elements 604 located at corners of the ESA 612, a person skilled in the art may appreciate that any peripheral disposition is envisioned.

Figure 6D:
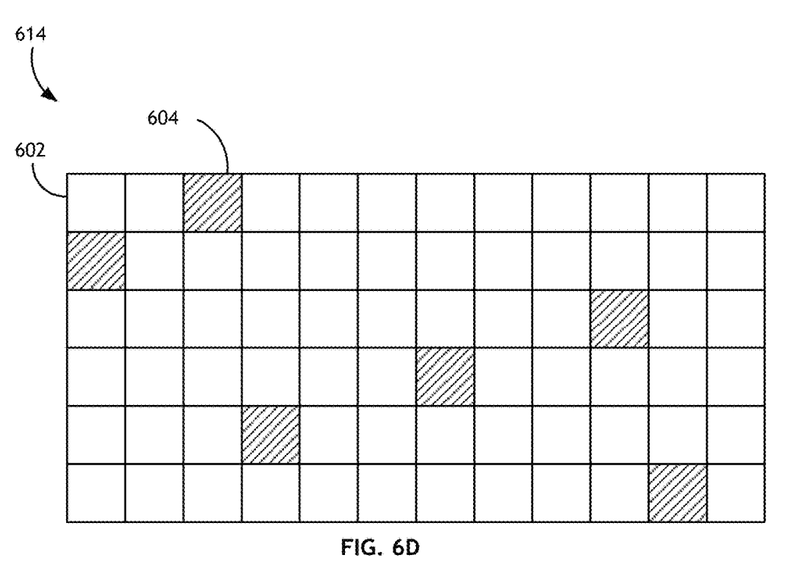
FIG. 6D shows a block diagram of a set of radiating elements in an ESA according to embodiments of the inventive concepts disclosed herein.

In some embodiments, an ESA 614 comprises operational radiating elements 602 and interference sensing elements 604. The interference sensing elements 604 are disposed randomly or pseudo-randomly about the surface of the ESA 614. Locating the interference sensing elements 604 randomly or pseudo-randomly allows for enhanced interference signal sampling.

Figure 6E:
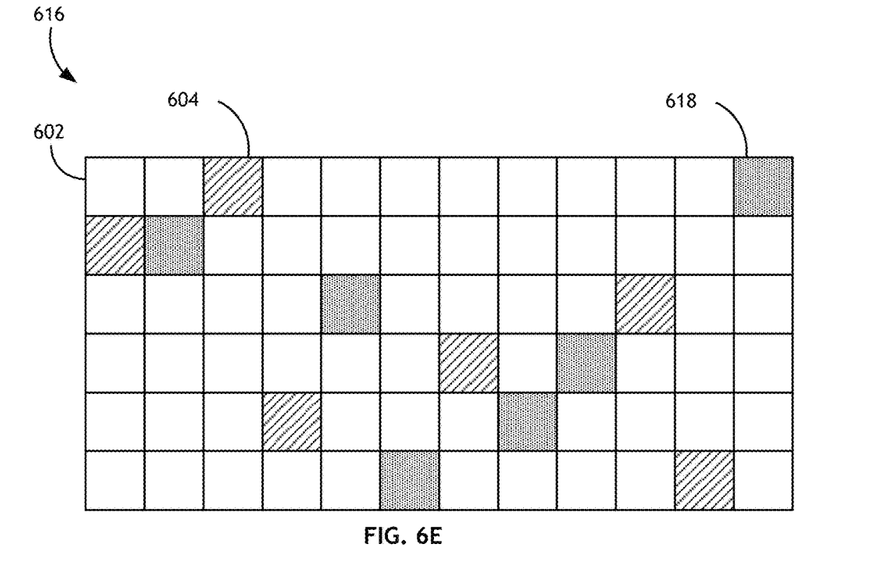
FIG. 6E shows a block diagram of a set of radiating elements in an ESA according to embodiments of the inventive concepts disclosed herein.

In some embodiments, an ESA 616 comprises operational radiating elements 602, interference sensing elements 604, and alternative interference sensing elements 618. The interference sensing elements 604 are disposed randomly or pseudo-randomly about the surface of the ESA 616. The alternative interference sensing elements 618 are also located randomly or pseudo-randomly. The alternative interference sensing elements 618 may comprise normally operational radiating elements 602 that are periodically re-tasked to perform the functions of interference sensing elements 604 if certain of the interference sensing elements 604 fail, or if desired gain pattern response requires different sets of operational radiating elements 602.

Figure 7:
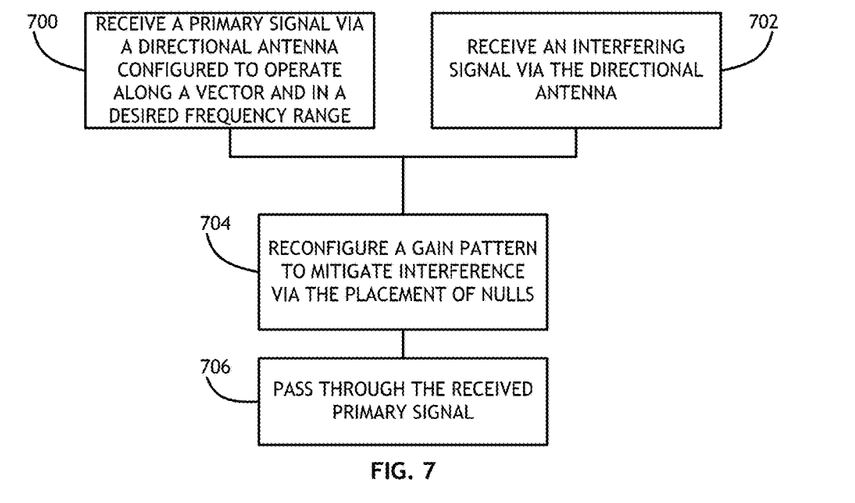
FIG. 7 shows a flowchart of a method for removing interfering signals from an adjacent source according to the inventive concepts disclosed herein.

Referring to FIG. 7, a flowchart of a method for filtering out interfering signals from an adjacent source, such as an adjacent interfering satellite, according to the inventive concepts disclosed herein is shown. A processor receives 700 a primary signal from a directional antenna configured to operate along a desired vector and within a desired frequency range. The ESA is also configured to receive 702 an interfering signal.

In some embodiments, the processor dynamically reconfigures 704 the gain pattern response to mitigate the interfering signal via placement of nulls. The processor then passes through 706 the primary signal.

Figure 8:
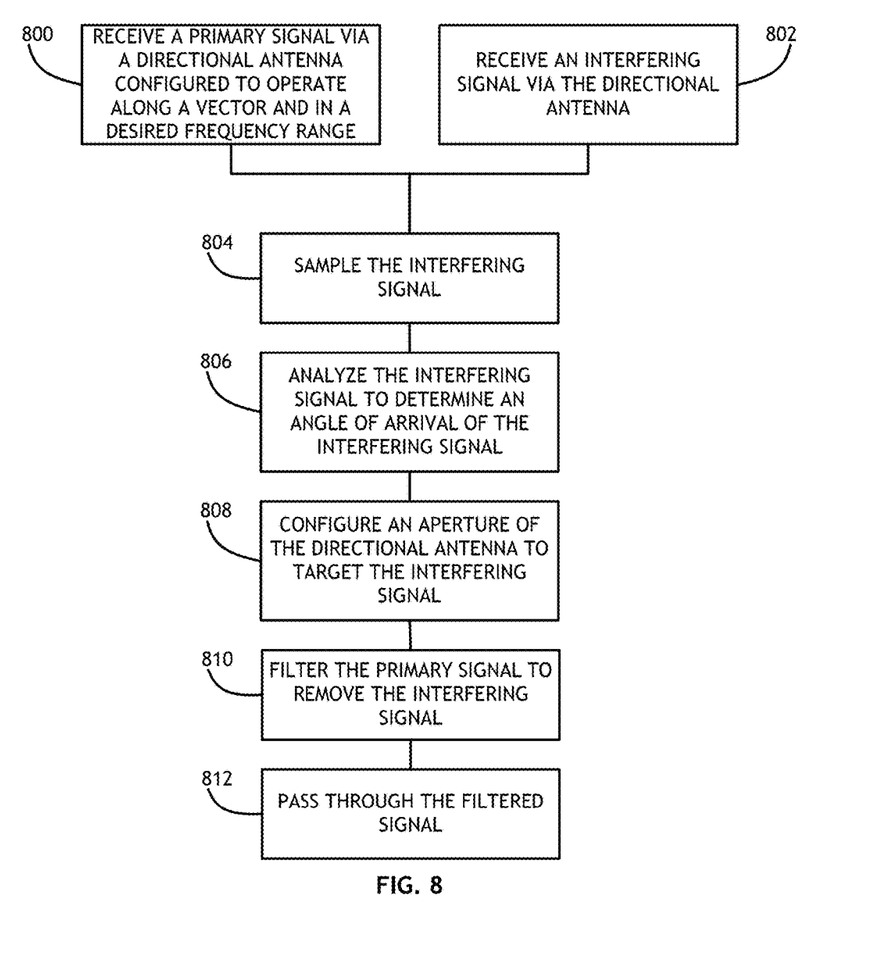
FIG. 8 shows a flowchart of a method for removing interfering signals from an adjacent source according to the inventive concepts disclosed herein.

Referring to FIG. 8, a flowchart of a method for filtering out interfering signals from an adjacent source, such as an adjacent interfering satellite, according to the inventive concepts disclosed herein is shown. A processor configures a plurality of operational radiating elements to receive 800 a primary signal and a plurality of interference sensing elements to receive 802 an interfering signal. The processor samples 804 the interfering signal via a digital signal processor and in some embodiments analyzes 806 the interfering signal to determine an angle-of-arrival of the interfering signal. Analyzing 806 the interfering signal may comprise analyzing a covariance matrix of signals from a plurality of phase centers to accurately determine the angle-of-arrival of various signals and selecting the desired signals in place of the adjacent interfering signals based on pointing angle from an almanac.

In some embodiments, the processor configures 808 or reconfigures the plurality of interference sensing elements or operational radiating elements to receive 802 to more accurately isolate the interfering signal. Configuring 808 the interference sensing elements and operational radiating elements may comprise applying code-division multiple access type techniques to improve interfering signal rejection within a main lobe of a beam.

In some embodiments, configuring 808 the interference sensing elements and operational radiating elements may comprise applying binary-phase shift keying via phase shifters or variable gain amplifiers to each radiating element or blocks of radiating elements to form multiple phase centers within a subarray. The primary signal is then filtered 810 to remove the interfering signal and the filtered signal is passed through 812.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. A computer apparatus comprising:
   at least one processor;
   an electronically scanned array (ESA) antenna connected to the at least one processor; and
   memory connected to the at least one processor storing processor executable code for configuring the at least one processor to:
      identify an interfering adjacent signal;
      configure a first set of radiating elements in the ESA to sample the interfering adjacent signal;
      configure a second set of radiating elements in the ESA to receive a composite signal corresponding to a desired gain pattern response;
      determine one or more signals to apply to each of a plurality of radiating elements in the ESA to produce a gain pattern response having nulls corresponding to the interfering adjacent signal;
      apply the one or more signals to the ESA; and
      filter the interfering adjacent signal from the composite signal to produce a desired signal.

2. The computer apparatus of claim 1, further comprising a digital signal processor connected to the processor, the digital signal processor configured to:
   receive the interfering adjacent signal; and
   analyze the interfering adjacent signal to determine an angle-of-arrival of the interfering adjacent signal; and
   wherein the memory further stores processor executable code for configuring the at least one processor to re-configure the first set of radiating elements based on the determined angle-of-arrival.

3. The computer apparatus of claim 1, wherein the first set of radiating elements are disposed in a regular pattern upon the surface of the ESA.

4. The computer apparatus of claim 1, wherein the first set of radiating elements are disposed at one or more peripheral locations on the ESA.

5. The computer apparatus of claim 1, wherein the processor executable code further configures the at least one processor to:
   configure a third set of radiating elements in the ESA to sample the interfering adjacent signal; and
   re-configure the first set of radiating elements to receive the composite signal corresponding to the desired gain pattern response.

6. The computer apparatus of claim 1, further comprising a data storage element connected to the at least one processor, storing an almanac of satellite configuration data, wherein the memory further stores processor executable code for configuring the at least one processor to identify an operational range of the interfering signal with reference to the almanac.

7. A satellite system comprising:
   at least one processor;
   an electronically scanned array (ESA) antenna connected to the at least one processor; and
   memory connected to the at least one processor storing processor executable code for configuring the at least one processor to:
      configure a first set of radiating elements in the ESA to sample an interfering adjacent satellite signal;
      determine one or more signals to apply to each of a plurality of radiating elements in the ESA to produce a gain pattern response having nulls corresponding to the interfering adjacent signal;
      apply the one or more signals to the ESA;
      configure a second set of radiating elements in the ESA to receive a composite signal corresponding to the gain pattern response; and
      filter the interfering satellite signal from the composite signal to produce a desired signal.

8. The satellite system of claim 7, further comprising a digital signal processor connected to the processor, the digital signal processor configured to:
   receive the interfering adjacent satellite signal; and
   analyze the interfering adjacent satellite signal to determine an angle-of-arrival of the interfering adjacent satellite signal; and
   wherein the processor executable code further configures the at least one processor to re-configure the first set of radiating elements based on the determined angle-of-arrival.

9. The satellite system of claim 8, wherein the first set of radiating elements are disposed in a regular pattern upon the surface of the ESA.

10. The satellite system of claim 8, wherein the first set of radiating elements are disposed at one or more peripheral locations on the ESA.

11. The satellite system of claim 8, wherein the memory further stores processor executable code for configuring the at least one processor to:
   configure a third set of radiating elements in the ESA to sample the interfering adjacent satellite signal; and
   re-configure the first set of radiating elements to receive the composite signal corresponding to the desired gain pattern response.

12. The satellite system of claim 7, further comprising a data storage element connected to the one or more processors, storing an almanac of satellite configuration data, wherein the memory further stores processor executable code for configuring the at least one processor to identify an operational range of the interfering satellite signal with reference to the almanac.

13. A method for mitigating interference in a satellite signal comprising:
   identifying an interfering adjacent signal;
   determining one or more signals to apply to one or more antennas to produce a gain pattern response having nulls corresponding to the interfering adjacent signal;
   configuring a first antenna aperture to sample the interfering adjacent signal;
   configuring a second antenna aperture to receive a composite signal corresponding to a desired gain pattern response;

filtering the interfering adjacent signal from the composite signal to produce a desired signal; and applying the one or more signals to the one or more antennas.

14. The method of claim 13, further comprising identifying an operational range of the interfering adjacent signal with reference to an almanac of satellite configuration data.

15. The method of claim 13, further comprising:

analyzing the interfering adjacent signal to determine an angle-of-arrival of the interfering adjacent signal; and re-configuring the first antenna aperture based on the determined angle-of-arrival.

16. The method of claim 13, wherein configuring the first antenna aperture comprises referencing an almanac of an almanac of satellite configuration data.

17. The method of claim 13, further comprising:

configuring a third antenna aperture to sample the interfering adjacent signal; and re-configuring the first antenna aperture to receive the composite signal corresponding to the desired gain pattern response.

* * * * *